United States Patent
Austin et al.

(10) Patent No.: US 8,390,836 B2
(45) Date of Patent: Mar. 5, 2013

(54) AUTOMATIC REVIEW OF VARIABLE IMAGING JOBS

(75) Inventors: Paul R. Austin, Webster, NY (US); Philip C. Rose, Sodus, NY (US)

(73) Assignee: Xerox Corporation, Norwalk, CT (US)

(*) Notice: Subject to any disclaimer, the term of this patent is extended or adjusted under 35 U.S.C. 154(b) by 1161 days.

(21) Appl. No.: 11/796,032

(22) Filed: Apr. 26, 2007

(65) Prior Publication Data

US 2008/0267512 A1    Oct. 30, 2008

(51) Int. Cl.
*G06K 15/00* (2006.01)

(52) U.S. Cl. ........ 358/1.14; 345/600; 355/52; 358/1.18; 382/112; 382/141; 382/218; 382/286

(58) Field of Classification Search ............... 358/1.14, 358/1.9, 1.12, 1.13, 1.15, 1.18; 235/375; 345/600; 355/52; 382/101, 103, 112, 144, 382/217, 286; 700/103; 705/1.1
See application file for complete search history.

(56) References Cited

U.S. PATENT DOCUMENTS

| | | | |
|---|---|---|---|
| 5,592,561 A * | 1/1997 | Moore ........................... | 382/103 |
| 5,982,945 A * | 11/1999 | Neff et al. ...................... | 382/271 |
| 6,157,875 A * | 12/2000 | Hedman et al. ................. | 701/1 |
| 6,854,904 B2 * | 2/2005 | Oshino et al. .................. | 400/103 |
| 2002/0191219 A1 * | 12/2002 | Bondy et al. ................... | 358/1.18 |
| 2004/0047494 A1 * | 3/2004 | Lee et al. ....................... | 382/118 |
| 2004/0086156 A1 * | 5/2004 | Furukawa et al. ............. | 382/112 |
| 2005/0189409 A1 * | 9/2005 | Conard et al. ................. | 235/375 |
| 2006/0115127 A1 | 6/2006 | Hatayama | |
| 2007/0212143 A1 * | 9/2007 | Ohara ............................. | 400/62 |

FOREIGN PATENT DOCUMENTS

| | | | |
|---|---|---|---|
| JP | 09330393 A | * | 12/1997 |
| JP | 2000029196 A | * | 1/2000 |
| JP | 2000029198 A | * | 1/2000 |
| JP | 2004151832 | | 5/2004 |
| JP | 2006150746 | | 6/2006 |

OTHER PUBLICATIONS

European Search Report for EP 08 15 3727 dated Feb. 24, 2011.

* cited by examiner

*Primary Examiner* — King Poon
*Assistant Examiner* — David S Cammack
(74) *Attorney, Agent, or Firm* — Fay Sharpe LLP

(57) ABSTRACT

A VI production system and method for automatic review of variable imaging job output includes a VI interpreter includes raster image processing for producing electronic output document images based on a variable imaging job included in a VI job stream. A proofing process includes obtaining sample document images from the output document images, and for each obtained sample document image, performing a review procedure. The review procedure includes comparing the obtained sample document image to a corresponding expected document image selected from the expected database to determine differences between the obtained sample document image and the corresponding expected document image. Based on at least one difference being determined, the differences are resolved by displaying the obtained sample document image on the user interface, indicating in the displayed sample document image each of the differences, and performing a difference procedure based on an operator input.

14 Claims, 7 Drawing Sheets

Page 1 of 1

Your City Bank
PO Box 123
Anytown, USA

Statement Summary For:

John Doe
Jane A. Doe
12345 Somewhere Road
Neighbortown, USA

Statement Period: Jan. 1, 2007 - Jan. 31, 2007
Customer Account Number: 999-111-007654321
Contact Us At: 1-000-555-1212

News You Can Use:

- *Home Equity Loans Now As Low As 7.5% APR.*
- *Now Earn Up To 1.5% On Your Checking Account.*
- *New Mortgage Refinancing Plans To Lower Your Monthly Payments.*

*Visit Your_City_Bank.com online for more details.*

Summary of Accounts:

Deposit Accounts:

| Account Type | Account Number | Balance |
|---|---|---|
| High Interest Checking | 123456 | $ 11,000.00 |
| Statement Savings | 234567 | $ 11,000.00 |
| Total | | $ 22,000.00 |

Loan Accounts:

| Account Type | Account Number | Balance |
|---|---|---|
| Home Owner Mortgage | 765432 | $ 111,000.00 |
| Total | | $ 111,000.00 |

*FIG. 1*

AUTOMATIC REVIEW OF VARIABLE IMAGING JOBS

BACKGROUND

Variable image (VI) print jobs are continually growing in terms of sophistication and complexity. Additions and deletions to VI print jobs are based on a growing number of conditions, such as, e.g., policy, a person's status, the company with which they are doing business (which may not be the company printing the reports), so it becomes important to check for correctness of the finished output product. Liabilities can be very large for an incorrect output. For example, a credit card company might send a person's bill to a wrong address, and perhaps repeat this for several million customers. Because of the increasing sophistication and the large volume, checking by hand becomes more and more difficult and tedious. Therefore, various methods of automating the process of checking have been developed. For example, checks can be scanned after printing, and an optical character recognition (OCR) process can be used for checking against a database for correctness. It would also be desirable, however, to check that the correct logo and other images have been printed, and that the correct paragraphs have been printed, etc. Every reasonable action must be taken to prevent mistakes.

This prevention of mistakes in VI print jobs applies not only to checks, but other documents as well. It applies anywhere that it is important to know that the correct images and text, such as amounts and account numbers, have been produced. Checking the accuracy of the output is of paramount importance because a specification of complex and lengthy variable image print jobs can involve complex interaction between data sources and can, therefore, lead to unexpected results. Errors in query logic can cause catastrophic information disclosure. For example, consider the impact of simply mailing credit card information to the wrong address for several thousand people. In current printing practice, operators check samples for correctness manually. It is not clear, however, that operators can or will catch all mistakes or that the sample set utilized for checking adequately exercises the query logic in order to reveal all problems. Therefore, there exists a need for improved methods for automatic review of variable imaging print jobs.

BRIEF DESCRIPTION

A method for automatic review of variable imaging job output is provided. Expected document images are maintained which are based on expected output of the variable imaging jobs. Sample output document images are obtained from the output of a variable imaging job, and for each obtained sample document image, a proofing procedure is performed. The proofing procedure includes comparing the obtained sample document image to a corresponding expected document image to determine differences between the obtained sample document image and the corresponding expected document image. Based on at least one difference being found, the differences are resolved by displaying the obtained sample document image, and indicating in the displayed image each of the differences. A difference procedure is performed for each difference based on a response from a system operator.

A second method for automatic review of a variable imaging job output is also provided. Expected document images are maintained which are based on expected output of the variable imaging jobs, as above. A set of source database query conditions is determined which represents all possible types of output document images in the variable imaging job output. After selecting sample output document images from the output of the variable imaging job output, it is determined if the selected sample output documents cover the full set of source database query conditions. Based on this, if the full set of source database query conditions is not covered, additional sample output document images are added to the selected sample output document images to cover the full set of source database query conditions. For each selected sample document image, a proofing procedure is performed which includes comparing the sample document image to a corresponding expected document image selected from the expected document images to determine differences between the sample document image and the corresponding expected document image. Based on at least one difference being determined, the identified differences are then resolved.

A VI production system is also provided which includes a VI interpreter system for received a VI job stream. The VI interpreter system includes a raster image processor configured to produce electronic output document images based on a variable imaging job included in the received VI job stream, a user interface for receiving instructions from an operator of the VI interpreter and for displaying messages and images to the operator, an expected database for storing at least one expected document image, a proofing system configured to perform a proofing process, and a finishing system configured to produce a final product based on the electronic output document images. The proofing process includes obtaining a plurality of sample document images from the output document images, and for each obtained sample document image, performing a review procedure. The review procedure includes comparing the obtained sample document image to a corresponding expected document image selected from the expected database to determine differences between the obtained sample document image and the corresponding expected document image. Based on at least one difference being determined, the differences are resolved by displaying the obtained sample document image on the user interface, indicating in the displayed sample document image each of the differences, and performing a difference procedure based on an operator input.

BRIEF DESCRIPTION OF THE DRAWINGS

FIG. 1 is an exemplary bank statement for illustrating concepts of the present application;

DETAILED DESCRIPTION

Figure 2:
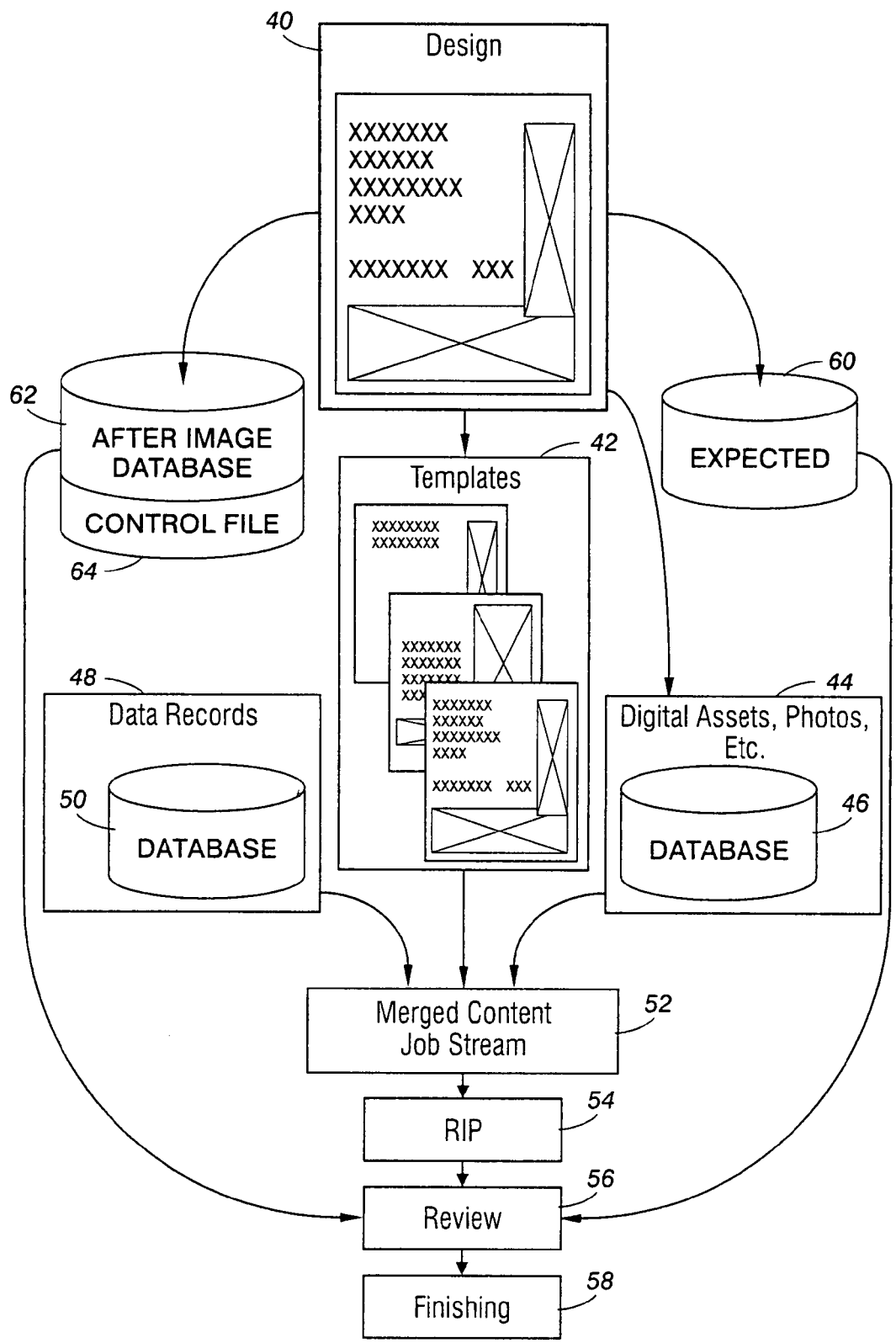
FIG. 2 is a diagram in block form illustrating a variable imaging environment suitable for incorporation of concepts of the present application.

Variable information printing is a form of printing in which elements such as text, graphics and images may be changed from one printed piece to the next within a print job using information previously obtained or currently obtained from a database. For example, a bank might prepare a set of personalized statements, each having the same basic layout, but each printed with different account information and different name and address information on each statement. With reference to FIG. 1, an exemplary bank statement 10 is shown for illustrating concepts of the present application. If the bank statement 10 is being printed by an in-house printing system of the bank, the bank information 12 and the bank logo 14 would essentially be constant from statement to statement. However, if the bank statement 10 is being printed by an outside third party provider, it is imperative that the third party provider insure that the bank information 12 and the bank logo 14 correctly represent the correct bank because the third party provider is processing print jobs for many clients.

Also shown on the bank statement 10 is a news section 20 which can be personalized according to known information about the account holders 16. Associated with the news section 20 is a news icon image 22 which serves as an eye-catch for the customer. Further shown is a summary of the accounts 24 and a second associated icon image 26 serving as a second eye-catch indicating summarization. Within the summary of accounts area 24 are shown three columns, one each for account type 28, account number 30 and ending balance 32. It can be readily appreciated that all of the information on the bank statement 10 must be accurate and consistent. It would be embarrassing and detrimental to the business of the bank if either of the bank information 12 or the bank image 14 is incorrect. It would be particularly damaging if the account information 16 is incorrect, showing information for another account holder, because of, e.g., the possibility of mailing account information including account numbers and balances to the wrong party. It is to be appreciated that the bank statement 10 has been shown for exemplary purposes only, for describing aspects of the present application, and it is to be further appreciated that the concepts described herein apply as well to any form of variable image printing.

With reference now to FIG. 2, a diagram is provided in block form for illustrating a variable imaging environment suitable for incorporation of concepts of the present application. In a design stage 40, variable information document layouts are designed and templates 42 are produced representing the designed documents. Digital assets are created and preferably stored in a digital asset database 46 for further use. The digital assets include such things as photos, icons and graphics for use on the variable information output. Data records 48 provided in, e.g., a database 50, contain detailed information pertaining to each variable information document, and the data contained therein can be merged based on the templates 42 with the digital assets 44 providing a merged content 52 in a variable information job stream. The variable information job stream typically represents a single job having variable documents to process, however, the stream of output from the VI print job may include output to multiple recipients, i.e., a section for each recipient or client. For example, several banks may use the same variable imaging provider and the job stream may include content from both banks.

Merged content 52 is normally a structured data stream that has elements that allow the production environment to understand that there are multiple sections and where each section starts and ends. Variable languages, such as PPML, and VIPP, and others known in the art will describe this to the production environment. Although this data can be ignored, the data is available and can either be utilized or ignored by the production environment. Thus, the added data does not necessarily impact a production environment that does not use or understand the data. The merged content 52 is, however, structured to delineate recipient boundaries, and it can also provide additional information about each recipient, e.g., order number, and other information such as name, etc.

The merged content 52 is processed by the production environment, as known in the art, by first performing a raster image processing (RIP) 54 to produce electronic output document images, and performing a reviewing process 56 to determine the accuracy of the RIP processing 54. Finishing operations 58 are then performed on the output document images to provide the end product. The reviewing process 56 may also be performed following the finishing operations 58 by either manually reviewing the end product or scanning the printed output for review by electronic means.

To facilitate concepts of the present application an expected database 60, an after-image database 62 and a control file 64 are provided. These are preferably created and/or maintained at the design stage 40 or in conjunction with the design stage and are later utilized during the review or proofing stage 56. The expected database 60, after-image database 62 and control file 64 are explained in more detail in the following description.

In the proofing stage 56 as shown in the figure, to insure that errors in processing are identified with reasonable certainty, it is essential to compare output of the RIP phase 54 or the finishing phase 58 for a sufficiently rich set of samples. This can be accomplished in some embodiments by scanning the output of the finishing phase 58, however, a soft proofing is preferably performed at lower cost if the generated output images are captured electronically from the RIP phase 54. It is, however, unlikely that output images will be identical to the expected images following changes in the specification, template and/or database. Therefore, a procedure is provided wherein, for each sample, image differences between the actual output and the expected output are presented to a user or authorized person reviewing the output.

The differences can be presented by any means known in the art, however, in embodiments described herein, differences are presented by highlighting them on the actual output. For each identified difference region, an operator can specify an action to be taken. For example, the operator can specify that the difference be ignored for this run, ignored indefinitely, that optical character recognition (OCR) be performed and the results compared with a constant or a database entry, or compared to a different region of the expected output in the event that an item has moved from its expected location. Subsequent variable information processing can use the resulting operator specifications to suppress further notifications of differences. In some embodiments, samples are reserved to check rather than generate the difference handling specifications. This effectively provides a visual mechanism for updating regression tests similar to the visual layout programs popular for authoring HTML documents. Subject to adequate coverage of the sample set and the specifications provided by the operator, this procedure is sufficient to insure that VI specification errors have been highlighted.

Figure 3:
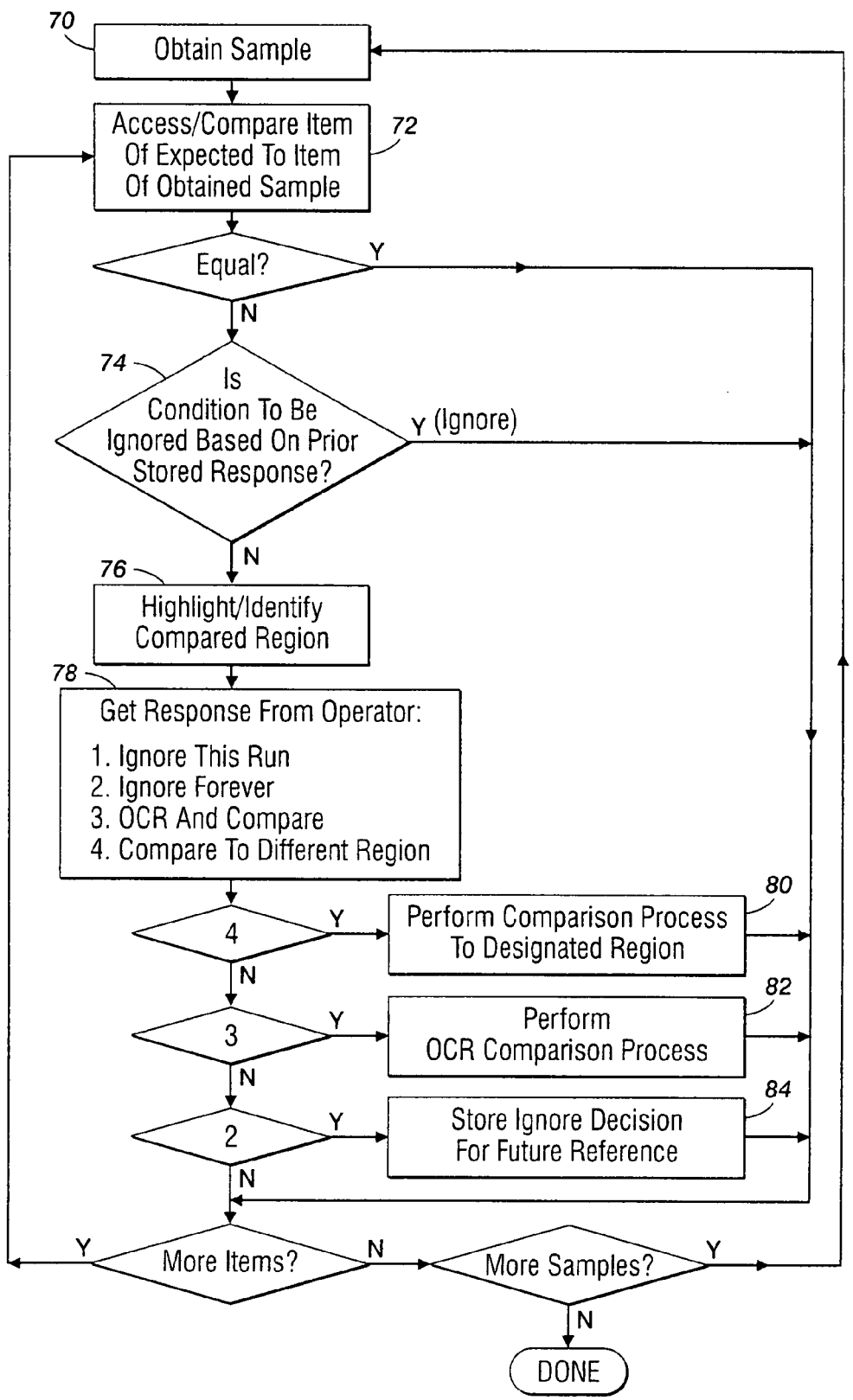
FIG. 3 is a flow chart of a proofing procedure according to concepts of the present application.

With reference now to FIG. 3, a flow diagram is shown for an embodiment of the proofing procedure 56 as described above. As previously shown, in preferred embodiments, the proofing process 56 is performed on electronically captured images from the RIP process 54, however, in alternate embodiments, the proofing process 56 is performed after the finishing process 58 based upon either of the scanned output documents or the electronically captured documents. At step 70, a sample document is obtained for analysis and proofing. Various methods for obtaining samples are known in the art, many of which are suitable for incorporation in embodiments of the present application. Concepts for insuring adequacy of the obtained samples are further described hereinafter in the present application. At step 72, the obtained sample is compared to the expected image provided in the expected database 60. If the obtained sample matches the expected image based on a comparison of the two, processing returns to step 70 if additional samples are available to continue processing.

If differences between the obtained sample and the expected image are encountered, it is first determined at step 74 whether or not each of the encountered differences has been previously encountered and if a prior operator specification exists requesting that it should be ignored. Differences that have not been specified to be ignored are highlighted or otherwise indicated and displayed to the operator at step 76. At step 78, a response is received from the operator as previously described, indicating whether the difference should be ignored for this run, ignored in the future, compared with a constant or database entry based on an OCR process, or if the highlighted region should be compared to a different region. In the event that further comparison is indicated, the further comparison is performed at step 80 and the resulting evaluation occurs again at step 82 as previously described. Operator responses are stored for future use at step 84, particularly for cases or differences which are determined to be ignorable in future runs. Processing returns again to step 70 as long as additional samples remain to be analyzed.

It is important, as previously described, to ensure that the sample set covers the logic used in templates and in queries. Each potential query needs to be evaluated to insure that at least one sample is provided in response to that query. If necessary, the system preferably prompts the operator to select additional samples from the database to expand the sample coverage. For conditional query logic, the sample set should include at least one sample for each true and each false value for each independent condition. This conditional logic analysis helps maintain a sample set that ensures template inquiry coverage of the VI specification. If it happens that a query or conditional logic condition is not exercised by any available sample, and there is no database entry that can be added to exercise that conditional logic, the query or conditional logic is probably not useful and can be removed.

One possible implementation technique for ensuring adequate coverage of all independent conditions of the conditional logic, involves representing the conditional logic of the query as a canonical Boolean decision diagram (CBDD). Each test case can be characterized by coverage of the branches in the CBDD. Uncovered branches can use the structure of the CBDD to create a query of the database which either identifies the particular records that will cover the query when added to the sample set or identifies that the query logic cannot be covered from the database and should therefore be removed since its correctness cannot be determined. The CBDD implementation can be enhanced by performing a score function on the coverage of each test case. This enables creation of a partial ordering and permits minimization of the test set size by selecting queries with the highest coverage scores for any previously uncovered logic path. For example, the method would start by marking paths covered by the test case having the highest coverage score and then choosing the next highest coverage score for the remaining unmarked paths and marking those paths. This process can be iterated until all reachable paths are covered. This combination of features can greatly facilitate a development and evolution of VI jobs in advanced print shops, departments and offices. These capabilities can potentially be integrated with a VI specification tool, preferably such that the regression test sample set is used to provide interactive visual development of the VI specification.

Figure 4:
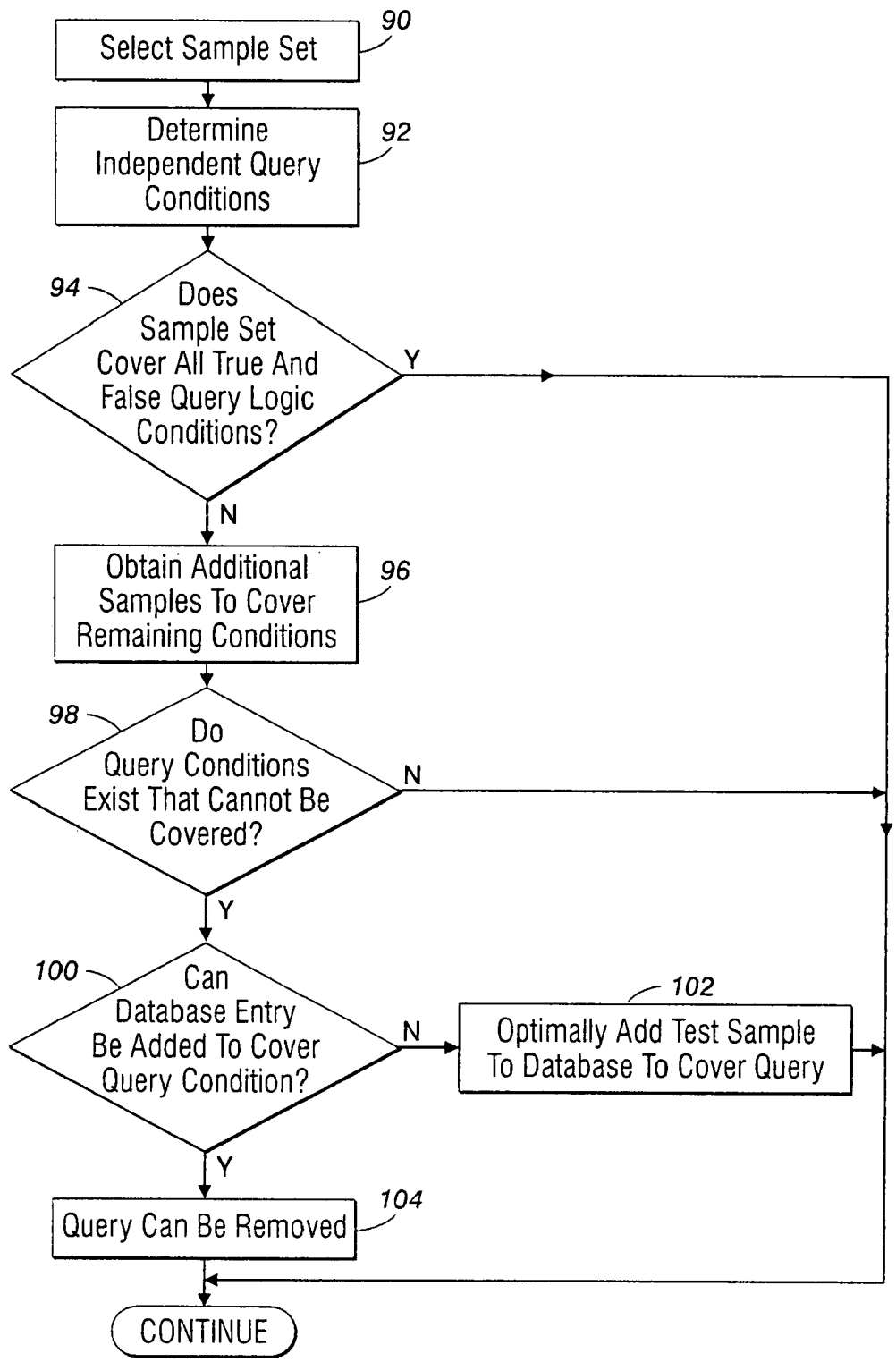
FIG. 4 is a flow chart of a method for ensuring complete coverage of conditional logic branches according to concepts of the present application.

With reference now to FIG. 4, a flow chart is shown for ensuring complete coverage of all the conditional logic branches by the selected sample set. At step 90, an initial sample set is selected according to methods known in the art. This set could be empty, and the procedure will then develop the test set from scratch. Or it could be last month's test set. At step 92, a determination is made of the independent query conditions which are possible based on the design stage 40. In one embodiment, these independent query conditions can be determined from the templates 42. At step 94, an analysis is performed to determine if the initial sample set covers the entire set of true and false query conditions previously determined. If it is determined that not all available true and false branches of the conditional query logic are represented by the sample set, additional processing is performed at step 96 where additional samples are obtained from the electronic documents to cover the remaining uncovered conditions when possible. However, if conditional logic queries exist, as determined at step 98, which cannot be covered by electronic documents in the output of the raster image processing 54, an analysis is performed at step 100 to determine if a test database entry can be added to cover the uncovered queries. For each uncovered query which can be covered by a test database entry, test samples are added at step 102 to the database to cover such queries. If, however, branches of the conditional logic exist which cannot be covered by any possible database entry, these conditional logic branches are likely not necessary and can be optionally removed as shown at step 104.

Figure 5:
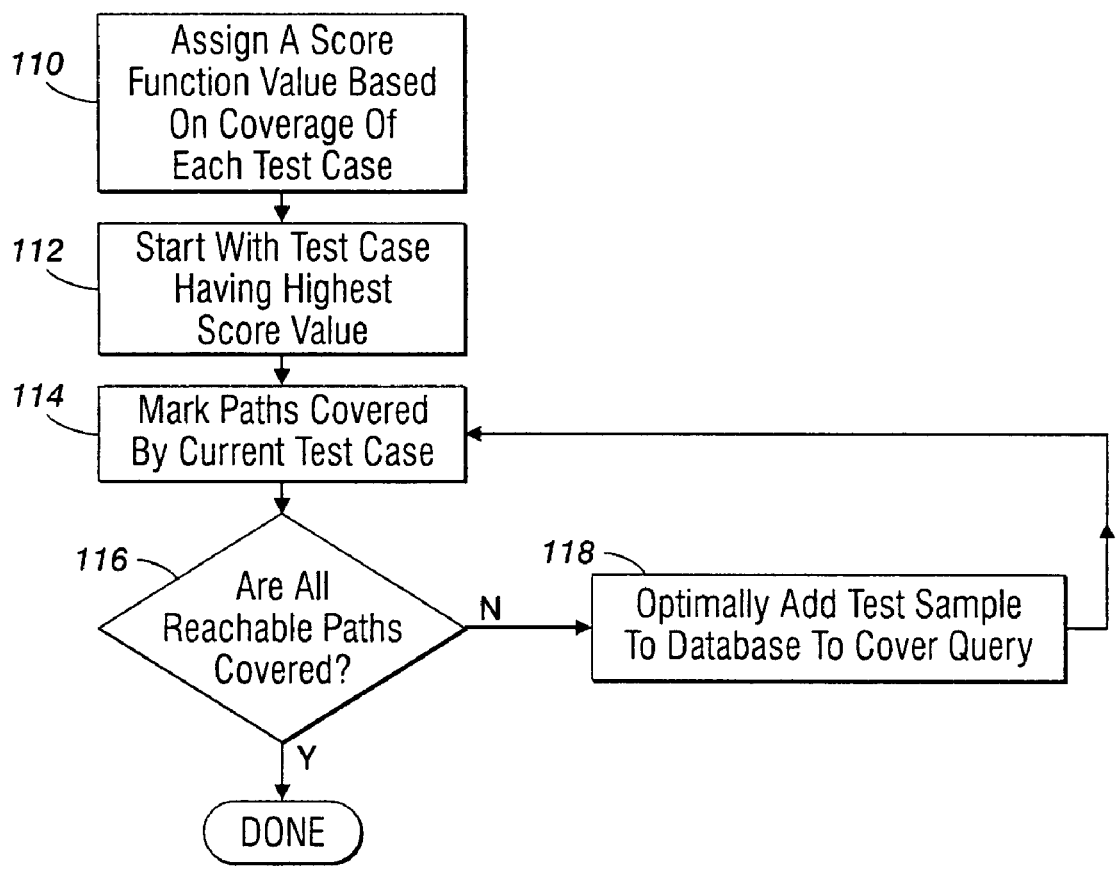
FIG. 5 is a flow chart of an enhancement to the flowchart shown in FIG. 4.

With reference now to FIG. 5, a flow chart is shown describing the previously mentioned enhancement for ensuring complete coverage by the sample set. At step 110, a score function is assigned to each test case representing a measure of the logic branches covered by the test case. Starting with the test case having the highest score function at step 112, the paths covered by that test case are marked at step 114. At step 116, it is ascertained whether all reachable paths have been covered by the test cases examined to this point. If not all branches or logic paths have been covered, the test case having the next highest score is chosen at step 118 and processing returns to step 114 for analysis of the paths covered as previously described.

One frequently occurring change to existing variable information jobs is the changing of an image upon a page. For example, when a company changes its name and/or logo, associated text and/or images are changed on the appropriate output pages. Other information on the pages, such as, for example, addresses and phone numbers, may remain largely the same even in the event of such image changes. However, OCR and other text based strategies can handle changes to addresses and phone numbers as previously described but are unable to address intended image alterations. Although the example described is the change of a company logo, it is to be appreciated that the concepts described herein are not limited to logo changes, but rather to any need to add, subtract, or alter any images within a variable information job. Preferred elements for incorporating the hereinafter described concepts are the after-image database 62 shown in FIG. 2, containing images as they should appear on a page after the intended alterations occur, and the control file 64, also shown in FIG. 2, defining the positioning of the intended after-images. For example, in a simple form, the after-image database 62 might contain image A, and the control file 64 would contain the new location of image A in the altered VI job. The user can create the altered VI job through methodologies known in the art, for example, Xerox VIPP, and the resultant files can be either electronically read or OCR scanned into one of these formats. A comparison engine can then look for the image area location within the electronic output file as identified by the control file 64 and compare this output area to the image provided in the after-image database 62.

It is to be appreciated that the previously described example is for explanatory purposes only. The concepts described herein apply also to more complex formats. For example, the control file can allow for image sizing in cases where, e.g., the after-image in the after-image database needs to be changed in size in order to be compared with the output area defined by the control file 64. Also, output areas may be intentionally left blank where an existing image is intended to be replaced by nothing, or an output area may be intended to have a new image which is, however, overlaid with variable text, thereby complicating the task of the comparison engine.

Figure 6:
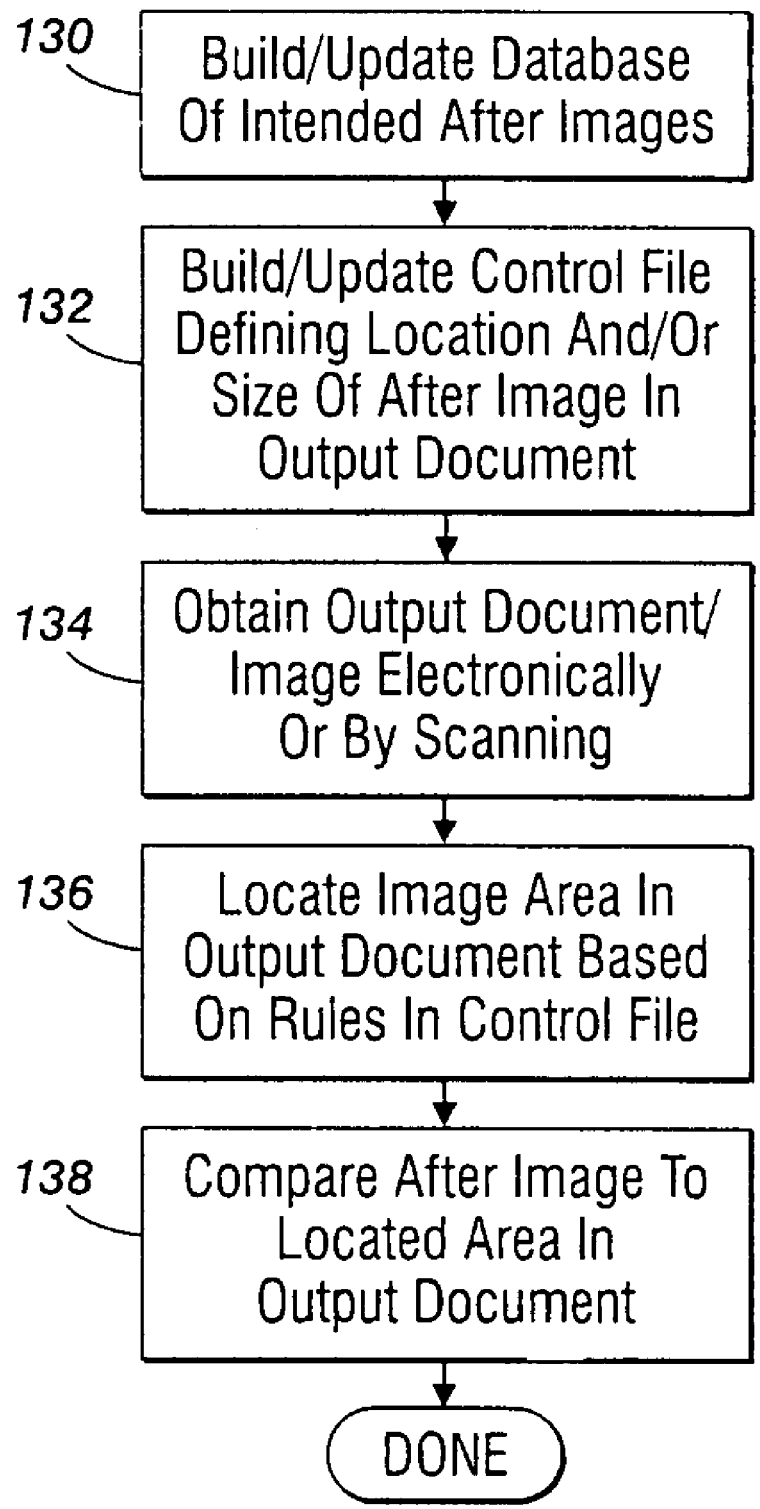
FIG. 6 is a flow chart of showing steps for verifying correctness of image changes in variable image jobs according to concepts of the present application.

With reference now to FIG. 6, a flow chart is provided showing the previously described steps for verifying correctness of image changes in variable image jobs. At step 130, the after-image database 62 is loaded with copies of the intended after-images. The control file 64 is similarly loaded with control files defining the intended location of the respective after-images in the after-image database 62. It is to be appreciated that the embodiment described is not the only way covered by concepts of the present application. For example, rather than having a separate control file describing the image locations, the after-images in the after-image database 62 may have embedded information or headers describing the intended locations. At step 134, an after-image output file is obtained electronically or by means of scanning. The intended image area is then located at step 136 based on information obtained from the control file 64. The located image area is then compared to the intended after-image at step 138, the comparison including any resizing, image insertion, image deletion, or text overlaying as previously described.

Figure 7:
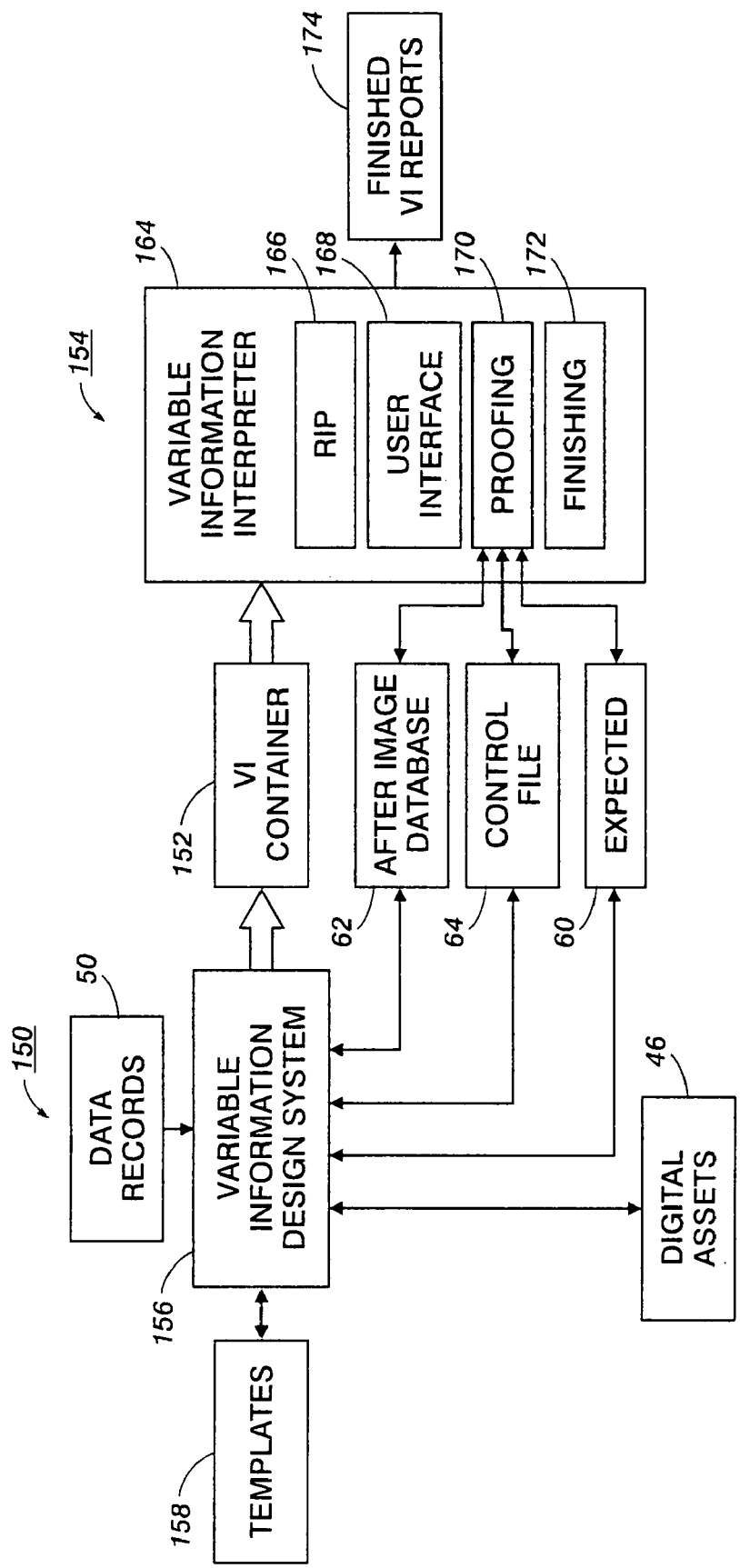
FIG. 7 is a block diagram showing an embodiment of a system incorporating concepts of the present application.

With reference now to FIG. 7 and continuing reference to FIG. 2, a block diagram is provided showing an exemplary system incorporating concepts of the present application, wherein like numerals are used to represent like items. In this exemplary system, a customer system 150 provides a VI container 152 containing the previously described merged content 52 for processing by a VI production environment 154. The customer system 150 includes a VI design system 156 configured to incorporate features of the previously described VI design stage 40. The VI design system 156 utilizes previously designed templates 42 or creates new templates for inclusion with the templates 42 which are preferably stored in a templates database 158. Based on the templates 42, the customer system 150 maintains the digital assets 44 stored in the digital assets database 46 for merging with the data records 48 stored in the data records database 50 to create the merged data content 52 in the VI container 152 as shown in the Figure.

The VI production environment 154 includes a VI interpreter 164 which further includes a raster image processor 166, a user interface 168, a proofing system 170, and a finishing system 172. The raster image processor 166 and the finishing system 172 are configured to perform methods as previously described with reference to the raster image processing 54 and the finishing operations 58 respectively. It is to be understood that each of the systems 166-172 can be included or housed internally as components of the VI interpreter 164 or can be separate systems in operative communication with the VI interpreter 164. The user interface 168 is utilized for interacting with the VI interpreter 164 and also for reviewing VI output before finishing. The VI interpreter 164 also produces the finished VI reports 174 as previously discussed and as known in the art. The expected database 60, the after-image database 62, and the control file 64 are maintained by the VI design system 156 and utilized by the proofing system 170 of the VI interpreter 164 as previously described with reference to FIGS. 2-6.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for automatic review of a variable information job, the method comprising:
   creating an expected document database containing expected images of variable information documents;
   providing a data record in a data records database, the data record including information pertaining to a variable information document;
   providing a template representing a designed document;
   providing at least one data asset in a digital assets database for use on the variable information document;
   merging the data record from the data records database with a digital asset from the digital assets database using the template to form merged content defining the variable information job;
   performing raster image processing on the merged content to produce an electronic output document;
   performing a proofing procedure for the electronic output document, the proofing procedure comprising:
      obtaining a sample document from the variable information job,
      comparing the sample document to a selected one of the expected images for determining a difference between the sample document and the one expected image,
      determining if the difference is a first-encountered or a previously-encountered difference,
      in response to the difference being a first-encountered difference, presenting in the sample document the difference between the sample document and the expected image,
      receiving an operator response specifying a corrective procedure for handling the difference, and
      storing the operator response for future handling of the difference as a previously-encountered difference; and,
   after the proofing, producing a final product.

2. The method set forth in claim 1, wherein the corrective procedure is selected from a list comprising:
   ignoring the difference for the variable information job;
   ignoring the difference for the variable information job and future variable information jobs;
   performing an OCR process on the difference;
   comparing a region of the sample document corresponding to the difference to an operator specified area of the expected image; and,
   a combination of the above.

3. The method set forth in claim 2, the OCR process including:
   computing an OCR output for the region of the sample document corresponding to the difference to at least one of a constant and a text database entry.

4. The method set forth in claim 2, the step of ignoring the difference for the variable information job and future variable information jobs including:
   obtaining a stored operator response requesting future ignoring of the difference.

5. The method set forth in claim 4, the step of ignoring the difference for the variable information job and future variable information jobs including:
   storing the operator response requesting future ignoring of the difference.

6. The method set forth in claim 1, the method further comprising:
   maintaining an after-image database, the after-image database containing a plurality of after-images, each after-image corresponding to an intended image in an image region of a corresponding output document image; and
   maintaining control data associated with each after-image, the control data defining the location and size of the image region of the corresponding output document image.

7. The method set forth in claim 6, the proofing procedure further comprising:
   for each after-image associated with the obtained sample document, locating the corresponding image region in the obtained sample document based on the control data; and
   comparing the located corresponding image region to the after-image.

8. The method set forth in claim 7, the proofing procedure further comprising:
   resizing the after-image to match the size of the located corresponding image region prior to the step of comparing.

9. A method for proofing a variable information document, the method comprising:
   providing an electronic output document, the providing including:
      merging a data record provided by a data records database with a digital asset provided by a digital assets database according to a template representing a designed document to generate a variable data job, and,
      performing raster image processing on the variable data job to generate an electronic output document image; and,
   verifying a correctness of the electronic output document, the verifying including:
      obtaining a sample document from the variable data job,
      comparing the sample document to an expected document image obtained from an expected document database of expected document images of variable information documents to determine at least one difference between the sample document and the expected document image,
      determining if the difference is a first-encountered or a previously-encountered difference,
      in response to the difference being a first-encountered difference, presenting in the sample document a first-encountered difference between the sample document and the expected document image,
      receiving an operator response specifying a corrective procedure for handling the difference, and
      storing the operator response for future handling of the difference as a previously-encountered difference; and,
   after the verifying, producing a final product based on the electronic output document image.

10. The method of claim 9, wherein the comparing includes:
    in response to the difference being determined as the first-encountered difference, highlighting the difference on a display; and,
    in response to the difference being determined as being the previously-encountered difference, obtaining a previously input user-instruction for handling the previously-encountered difference.

11. The method of claim 9, further including ignoring the difference for a selected run of the variable information job.

12. The method of claim 9, further including
    resolving the difference, the resolving including:
       displaying the sample document, and
       indicating in the displayed sample document each of the at least one differences.

13. The method of claim 9, wherein the comparing further includes:
    performing optical character recognition (OCR) on the electronic output document; and,
    comparing the OCRed sample document to an after-image provided by an after image database.

14. The method of claim 9, wherein comparing includes:
    obtaining from a control file a location information for the sample document in a control file;
    using the location information in the control file to locate a region for the sample document; and,
    comparing the sample document image to the expected image corresponding to the region.

* * * * *